C. WHITLOCK.
Cultivator.
No. 108,741. Patented Oct. 25, 1870.
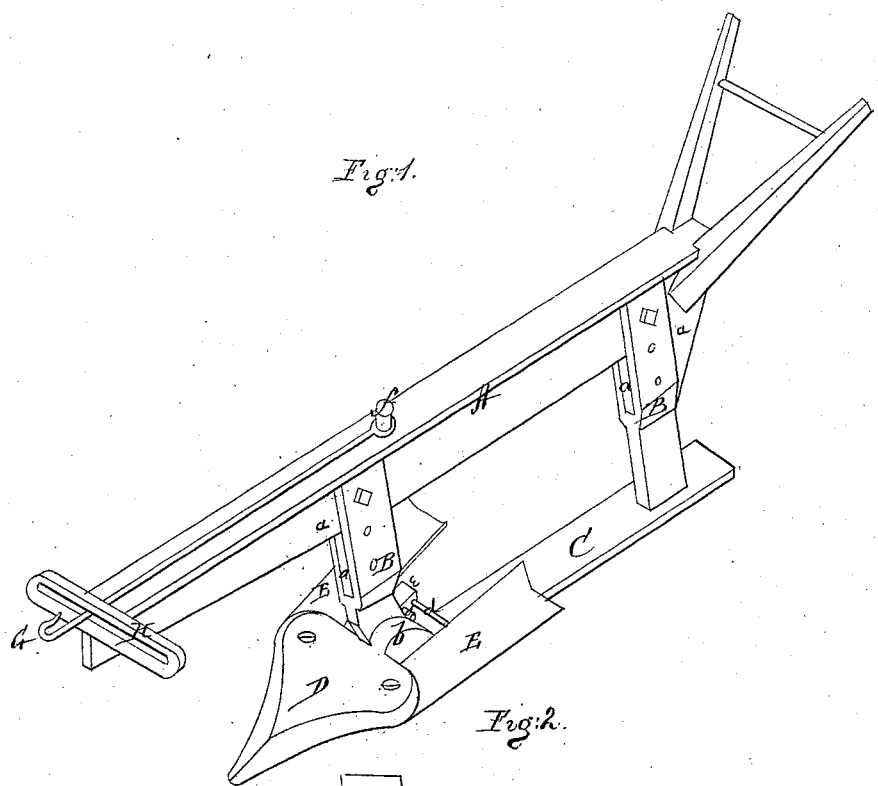
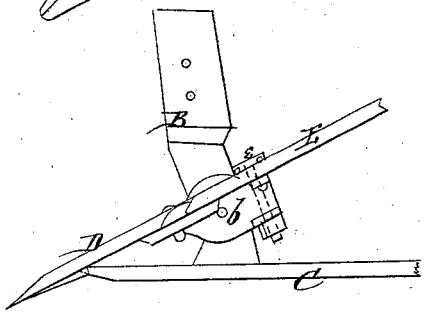
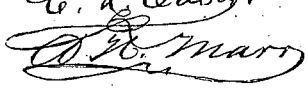

UNITED STATES PATENT OFFICE.

JOHN T. WHITLOCK, OF BRIDPORT, VERMONT, ADMINISTRATOR OF CYRUS WHITLOCK, DECEASED.

IMPROVEMENT IN HORSE-HOES.

Specification forming part of Letters Patent No. 108,741, dated October 25, 1870.

*To all whom it may concern:*

Be it known that CYRUS WHITLOCK, of Bridport, in the county of Addison and State of Vermont, did invent certain new and useful Improvements in Horse-Hoes; and I do hereby declare the following to be a full, clear, and exact description thereof, reference being had to the accompanying drawings, and to the letters of reference marked thereon.

The nature of his invention consists in the construction and arrangement of a horse-hoe, as will be hereinafter fully set forth.

In order to enable others skilled in the art to which his invention appertains to make and use the same, I will now proceed to describe its construction and operation, referring to the annexed drawings, which form a part of this specification, and in which—

Figure 1 is a perspective view of the entire horse-hoe, and Fig. 2 is a side view of the point and wing.

A represents the beam, provided on its under side with projections $a\ a$, which are inserted in the upper forked ends of the legs B B, said legs being made adjustable by means of set-screws or other suitable means, so as to be made longer or shorter at will. The lower ends of the legs B B are secured to the sole-piece C, at the front end of which the plow-point D is pivoted, said plow-point being fastened to the front leg B by means of a pin passing through ears $b\ b$, projecting from the base or rear end of the plow-point, and extending one on each side of the front leg. This front leg is provided with a series of holes through it, so that the point D can be adjusted to any angle desired.

On the sides of the plow-point D are pivoted the wings E E, which can be adjusted to any width desired. They are held by braces $d\ d$, which are secured on top of ears $b\ b$, in rear of the front leg B, by the bolt $e$, as shown.

The hook G, by which the hoe is drawn, is looped around the pin $f$, and the front end passes through the cross-piece H at the front end of the beam A, said cross-piece being slotted the whole length, so that the hoe can be swayed to the right or left independent of the strain on the hook G. The pin $f$ is placed on the beam so as to balance the forces.

Having thus fully described his invention, what I claim as new, and desire to secure by Letters Patent, is—

The beam A, with projections $a\ a$, adjustable legs B B, plow-point D, hinged to the sole-piece C, and the pivoted wings E E, braces $d\ d$, and bolt $e$, all constructed and arranged substantially as set forth.

In testimony that I claim the foregoing I hereunto set my hand and seal this 9th day of July, 1870.

JOHN T. WHITLOCK. [L. S.]

Witnesses:
 THOS. McLEOD,
 CALEB SMITH.